Nov. 8, 1955    B. J. FALK    2,723,206
GLAZING METHOD
Filed Aug. 18, 1953    2 Sheets-Sheet 1

INVENTOR.
BROR J. FALK
BY Ely, Frye & Hamilton
ATTYS.

Nov. 8, 1955　　　B. J. FALK　　　2,723,206
GLAZING METHOD
Filed Aug. 18, 1953　　　2 Sheets-Sheet 2
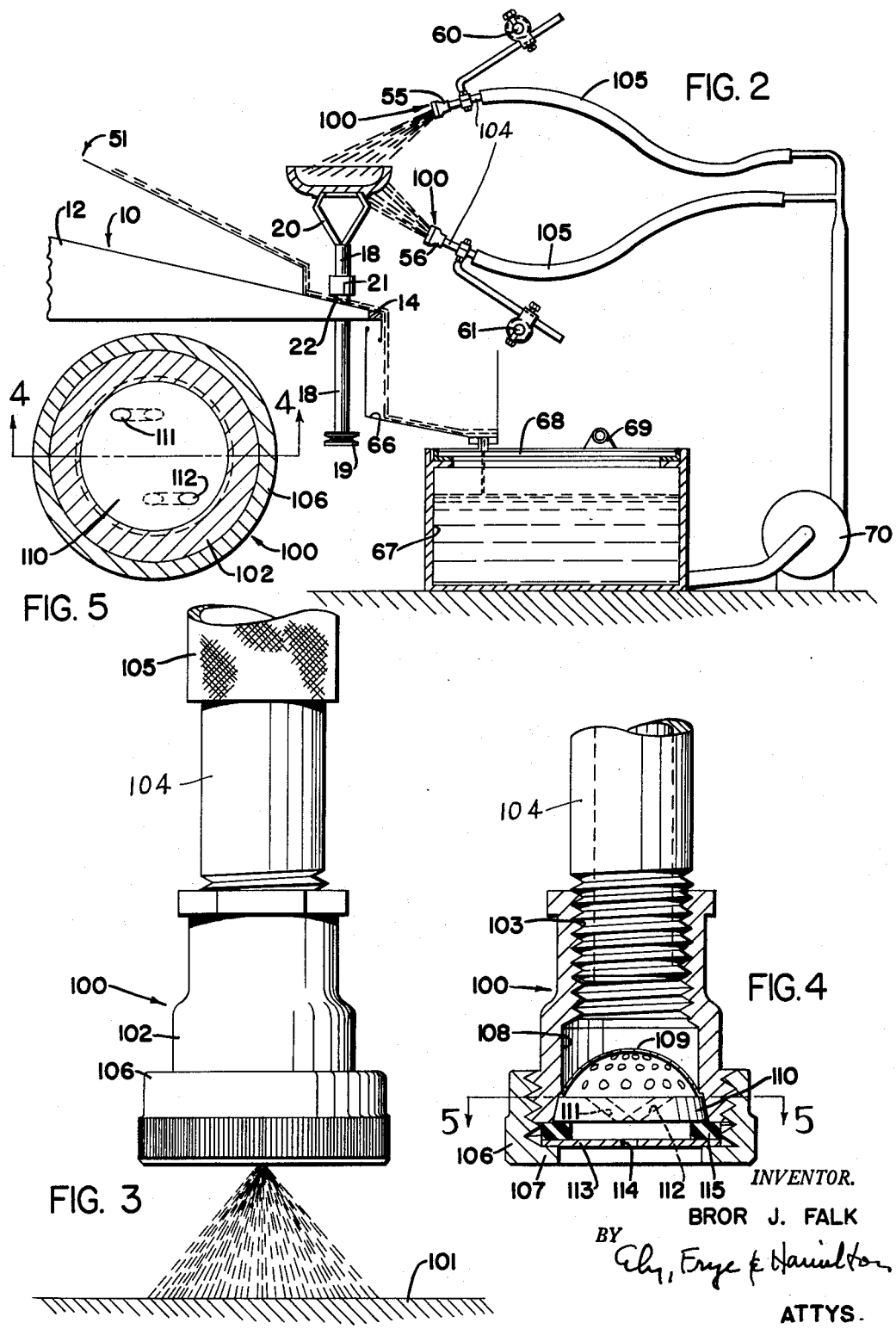
INVENTOR.
BROR J. FALK
BY Ely, Frye & Hamilton
ATTYS.

United States Patent Office 2,723,206
Patented Nov. 8, 1955

2,723,206
GLAZING METHOD

Bror J. Falk, Upsala, Sweden, assignor to Upsala-Ekeby Aktiebolag, Ekebybruk, Sweden, a corporation of Sweden Application August 18, 1953, Serial No. 374,911

3 Claims. (Cl. 117—102)

The present invention relates to a method of applying glazes, vitreous enamels and other ceramic coatings to non-absorbent and relatively non-absorbent surfaces such as those of metalware and ceramicware. The invention presently appears particularly advantageous in connection with the glazing of bisque ware or one-fired ware.

In the glazing and coating operations to which the invention relates, a primary problem and limitation has been the tendency of the coating to run or curtain on the coated surfaces, particularly those surfaces which are not horizontally disposed. In attempts to meet this problem, several factors have had to be taken into consideration. First, the coating composition must be sufficiently fluid to be successfully sprayed without nozzle occlusion. Secondly, the coating composition must be sufficiently viscous to prevent excessive running or curtaining on the coated surface. Third, a degree of wetting of the coated surface sufficient to assure an effective coating bond must be attained.

A special consideration with respect to the glazing of bisque ware is that porosity or absorbency of the ware may vary considerably according to the position of the ware in the kiln during the bisque fire. Accordingly, for the products of a given firing, the range of compromise between the three factors mentioned above is narrower than it is for a single piece.

The prior art has compromised between these several factors and attained acceptable results through the use of several expedients, each of which has some disadvantages. Thus, a common method of coating currently in widespread use throughout the pottery industry involves the use of an air spray gun, the air blast promoting drying of the sprayed compound so that it can be deposited in a semi-dry state on the surface being coated to avoid curtaining, but, at the same time, not too dry to preclude sufficient adhesion of the sprayed coat to the surface. This procedure generally requires that multiple coats be applied in order to build up to the desired coating thickness. Probably the main disadvantages are the original costs and the maintenance and operating costs involved in providing a continuous supply of high pressure air in such an operation. The provision, maintenance and operation of air compressors and distribution lines represent considerable expense. Further, the interaction of the high pressure air and the glazing compound results in the suspension in air of components of the glazing compound, which components must be recovered before overspray can be re-used. Washdown of the spray booth incident to such recovery results in an overwet glaze compound which must be reprocessed by sedimentation or equivalent treatment before re-use. Apart from cost considerations, recovery of air suspended components is mandatory because they are toxic and must not be exhausted along with the high volume of air which is injected into the spray booth. The power and equipment requirements of the air exhaust system is itself considerable. To enable simultaneous spraying of top and bottom ware surfaces in such manner as to cover the entire surface in one operation without the necessity of inverting the ware between two spraying operations, wareholders which support the bottom of the ware by point contact are frequently employed. In such installations, the use of high pressure air often causes blowing off of ware from the wareholders. Blowing off is particularly troublesome in connection with small ware pieces which have a relatively low mass.

Another expedient, which has proved less desirable than high pressure air, involves subjecting the spray to heat, as by an intersecting flame, during travel of the spray from the nozzle to the surface to be coated. Again, considerable costs are associated with such auxiliary equipment.

Dipping is an age-old glazing method which avoids curtaining and tearing only with the use of the highest skill in manipulating the dipped ware. Uniform results are extremely difficult to obtain with this method, which is also inherently slow and, from the mass-production viewpoint, extremely expensive.

Still other methods of glazing or coating have been developed which avoid undue curtaining or running of the coating. Common to all these methods, however, is the expense and operating cost of the auxiliary equipment involved. The simplification of such coating operations and elimination of the necessity for auxiliary equipment has long been needed. This need has been particularly felt in the ceramic industry where an annual production of many thousands of dozens of tableware pieces must be perfectly glazed on a mass production basis and where dust, moisture and similar plant conditions common to the industry compound the cost of maintaining such auxiliary equipment in working condition.

The invention embodies the discovery that liquid glazing compositions may be caused to effect an apparent change in their fluidity characteristics between the spray nozzle and the surface being coated without the use of auxiliary air or any other auxiliary agent. This is accomplished through vortexial atomization similar to that which has been widely employed for years in the combustion of liquid fuels. I have found that under entirely feasible fluid pressures a glazing spray can be produced having, in the aggregate, surface characteristics such as to cause an apparent change in fluidity between nozzle and object surface which avoids curtaining, provides sufficient wetting, and avoids obtaining orifice occulsion with too viscous a glaze fluid.

The amount of oversprayed glaze which must be reprocessed in the use of my invention amounts to four or five percent of the amount which must be reprocessed in conventional spray glazing. Toxic substances are not released into the air but remain in liquid suspension throughout the recirculation cycle of the glaze mixture. Equipment for high pressure air supply and high volume exhaust is eliminated.

Thus the use of extremely simple and foolproof apparatus in glazing and in other ceramic coating operations is made possible; expense, operating and maintenance costs of auxiliary equipment heretofore required are avoided.

A description of a specific embodiment of the invention is set forth below and in the accompanying drawings in which:

Figure 2 is a partially schematic elevation in cross-section taken generally along line 2—2 in Figure 1, certain structure being omitted from this view and other structure being indicated only schematically;

Figure 3 is a detail view on an enlarged scale of a form of nozzle which may be used according to my invention;

Figure 4 is a cross-section of the nozzle shown in Figure 3;

Figure 5 is a cross-section taken on line 5—5 in Figure 4.

Figure 1:
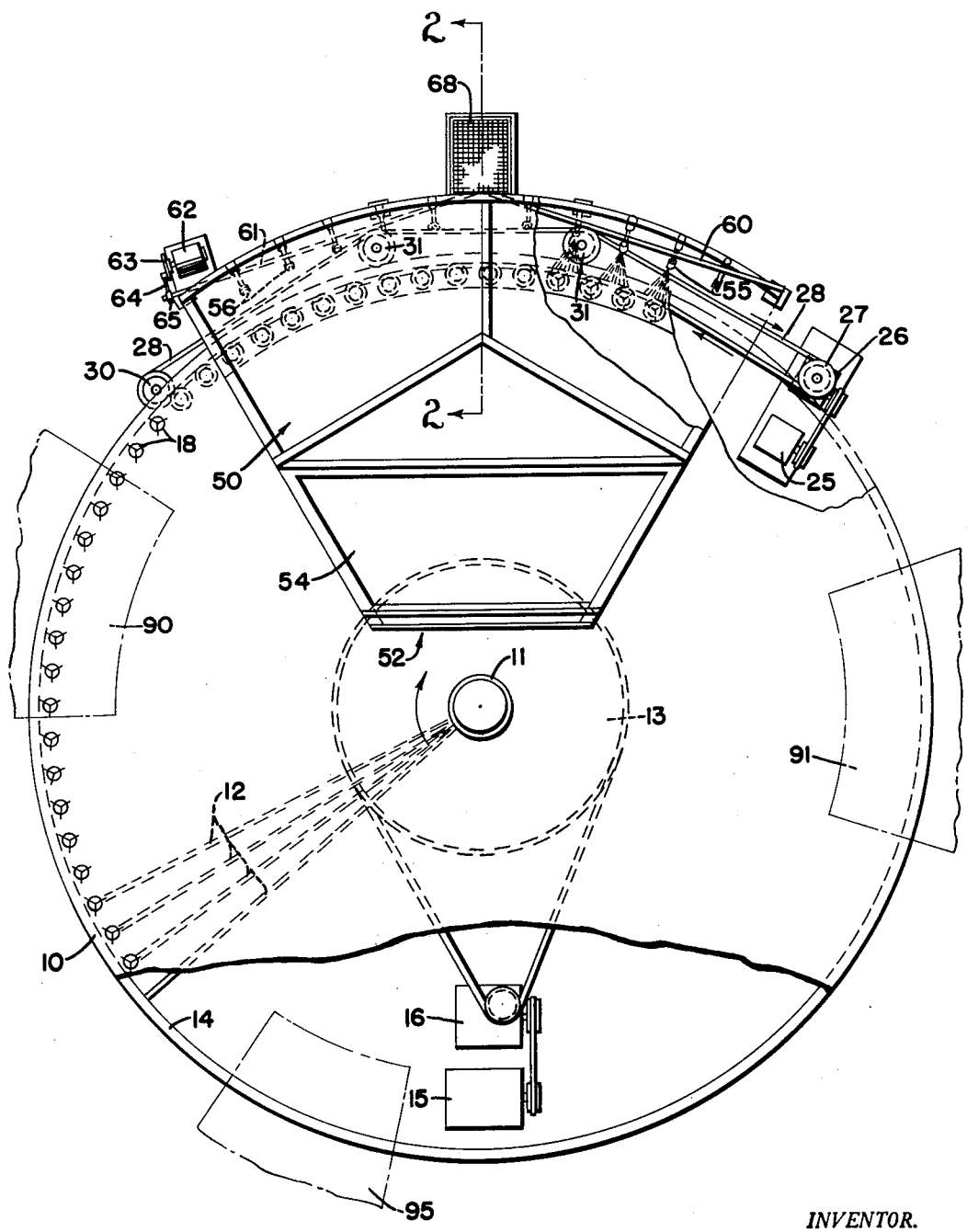
Figure 1 is a plan view of a glazing installation in which the invention may be employed.

An installation embodying my invention may comprise a large conical table, the apex of the table being over a central shaft 11 which is rotatably mounted on the floor of the premises. A plurality of radial cantilever beams 12 (see Figure 2) are fixed to the shaft 11 and a rim 14 to support the table 10. A large pulley wheel 13 is mounted on the shaft 11. The table 10 is rotated by the motor 15 which drives through a speed reducer 16 and the pulley 13.

Mounted around the periphery of the table 10 and substantially equally spaced from each other are a plurality of spindles 18. Each spindle 18 carries a small V-belt pulley 19 on its lower end below the table 10, and above the table it is equipped with a removable ware holder 20 provided, preferably, with three wire prongs. A cup 21 is carried on the portion of the spindle which extends above the table to protect the bearing 22 of the spindle from glaze.

A spindle drive is located at one side of the table and comprises a motor 25 and speed reducer 26 which carries a drive pulley 27 adapted to engage the flat back of a V-belt 28. At the other end of the drive is a main idler pulley 30, the drive pulley 27 and idler pulley 30 being so located that a line through their centers would be a chord subtending an arc of the spindle orbit across the side of the machine. Each spindle pulley 19, as it passes across the side of the machine, therefore, engages the V-face of the V-belt 28 which is driven by the main drive pulley 27 and supported by the main idler pulley 30. Because the path of the drive portion of the V-belt is arcuate, the return portion of the V-belt is spaced therefrom by the auxiliary idler pulleys 31. The V-belt 28 thus is employed to impart planetary motion to the spindles 18 across one side of the machine. The rotation of the spindles is usually in a direction opposite to the direction of revolution of the table 10, and, if the table 10 revolves in a clockwise direction, as shown, the V-belt pulley 28 may be driven in a counter-clockwise direction to increase the speed of rotation of the spindles over that which would be obtained if the V-belt 28 were held stationary. Since the speed and direction of the drive pulley 27 is variable, the speed of rotation of the spindles 18 is variable over a wide range and may be decreased from a high counter-clockwise speed to a peripheral speed, i. e., the spindle rotation speed obtained when the V-belt 28 is stationary, and, by reversing the motor 40, the spindle speed may be further reduced until there is no spindle rotation at all, i. e., when the speed and direction of the V-belt are equal to the peripheral speed of the table 10.

A spray booth 50 is located over the front of the table 10 and is provided with a floor 51 converging upwardly and rearwardly toward a back wall 52. The outer margin of the floor 51 is conical so that the edge thereof is closely adjacent the conical surface of the table 10 inside the spindles 18. An inspection and wash-down door 54 may be provided in the top of the booth. The front of the booth is curved to be substantially concentric with the table 10 and is located outwardly beyond the periphery of the table 10, so that the spindles 18 travel within the booth 50. The front wall of the booth is preferably closed except for horizontal openings (not shown) to accommodate a line of spray guns.

An upper line of spray guns 55 may be mounted on a mounting rod 60 and a lower line of spray guns 56 on another mounting rod 61. The mounting rods may be either fixed or mounted for oscillatory movement. In Figure 1, rod 60 is shown as fixed and rod 61 is indicated as being powered by an oscillatory drive comprising a motor 62, a power eccentric 63, a link 64, and a driver crank 65 mounted on the rod 61.

The floor 51 of the spray booth overhangs a trough 66 which collects excess glaze and returns it to the reservoir 67 through a bouncing lawn 68 which may comprise a fabric, preferably finely woven lawn or muslin, mounted on a frame which may be agitated by a suitable power means (not shown) which reciprocates an ear 69 affixed to the frame of the bouncing lawn. The liquid glaze is supplied to the guns through a suitable pump 70.

In many glazing operations, heat treatment of ware immediately before and/or immediately after application of the glaze is desirable. For this purpose there may be included one or more heat tunnels over either or both the input or output side of the table 10. In Figure 1, heat tunnels 90 and 91 are indicated schematically as being located over the input and output sides of the table 10, the tunnels being supported by suitable means (not shown). The tunnels are so placed as to receive the spindles 18 as they are transposed therethrough by the table 10 and may have arcuate slots along their undersides through which the spindles extend. The details of the tunnel construction are in no way critical to the subject matter of the invention and for purposes of clarity such details are therefore not illustrated or exhaustively described. A wareholder washer 95 may also be provided as indicated schematically in Figure 1. This washer may comprise an open-ended water jet chamber similar to any of those types which will be familiar to those in the art.

A preferred nozzle 100 which is employed in practicing the invention is shown in particular detail in Figure 3. This nozzle is presented in spaced relation to a schematically indicated surface 101 which is to be glazed or coated and which may represent the surface of a piece of ceramic ware or other material of little or no porosity.

As shown in Figure 3, the nozzle 100 may comprise a body portion 102 which is tapped at 103 to threadedly receive a length of pipe 104 which may, in turn, be coupled to a flexible conduit 105 leading from the glaze pump 70.

Threadedly engaged on the enlarged outer end of the body portion 102 is a knurled cap 106 having an inwardly extending outer flange 107. Received within the intermediate bore 108 of the body portion 100 is a dished insert 109 punctured at a multiplicity of points throughout its area and a disc 110 having one or more acutely sloping passages, such as the passages 111 and 112, passing therethrough. Retained against the outer flange 107 is a disc 113 having a relatively small orifice 114 formed in the center thereof. Received within the cap 106 is a washer 115 which holds the disc 113 in spaced relation from the disc 110 when the cap is fully tightened down.

Liquid glaze fed through the conduit 105 under pressure will be forced through the passages 111 and 112 in the disc 110 and the jets of fluid leaving these passages will induce and sustain a rapid annular circulatory movement within the chamber formed by the discs 110 and 113 and the washer 115. The pressure head throughout the nozzle interior constantly forces a fluid discharge out of the orifice 114 in the form of a spray.

It is not clearly understood what physical and mechanical characteristics of the spray issuing from the orifice 114 render such spray so adapted to the purposes of glazing and ceramic coating. It may be supposed that extremely high aggregate surface area of the spray has a direct bearing on the superior results attained, but it must be borne in mind that, despite such high surface area, air suspension of toxic elements is eliminated. It is only known empirically that very superior results are obtained with simple equipment through the employment of direct pressure atomization such as that provided by the illustrated nozzle or equivalent nozzle structures. It will be understood that a variety of nozzle arrangements are possible, and that even the nozzle specifically illustrated may be varied in many ways without precluding successful operation of the invention, as by elimination of the punctured dished insert 109 or provision of this insert in non-dished form suitably spaced from the disc 110. It will also be apparent that numerous installations other than that which is specifically illustrated in Figures 1 and 2 may be employed in the practice of the invention, such illustrated installation being merely exemplary of the great variety of types of production equipment which could be utilized in practicing the invention.

These and other possible alternatives will demonstrate that the scope of my invention is not to be limited to the specific embodiment illustrated but is to be defined by the following claims.

What is claimed is:

1. The method of spray coating fusible glazes and other ceramic coating on material of varying absorbency including ceramic ware and non-absorbent and relatively non-absorbent material including metal wherein for a mixture of an aqueous liquid carrier and fusible ceramic solids suspended therein there is provided a cycle of recirculation so that the sprayed excess of the ceramic solids in said mixture may be re-used in spraying of succeeding objects to be coated, comprising, the steps of providing a reservoir for said mixture, withdrawing said mixture from said reservoir, subjecting said withdrawn mixture to pressure and directing said mixture in a cyclic path within a nozzle structure, said cyclic path having a vortex, discharging said mixture through an orifice at the center of the vortex of said cyclic path toward a succession of objects to be coated, maintaining said orifice within range of such objects but at a distance from such objects sufficient to allow atomization and dispersion of said mixture before contact with such objects, impinging overspray on solid surface means provided in the path of the overspray, and collecting overspray run-off from said surface means and returning said run-off to said reservoir.

2. The method of applying fusible glazes and other ceramic coatings on material of varying absorbency including ceramic ware and non-absorbent and relatively non-absorbent material including metal which comprises the steps of providing under pressure a coating comprising a mixture of an aqueous liquid carrier and fusible ceramic solids suspended therein, directing said mixture in a cyclic path within a nozzle structure, said cyclic path having a vortex, discharging said mixture through an orifice at the center of the vortex of said cyclic path and toward the surface of the object to be coated, maintaining said orifice within range of such object but at a distance from such object sufficient to allow atomization and dispersion of said mixture before contact with such object, impinging overspray on solid surface means provided in the path of the overspray, and collecting overspray run-off from said surface means.

3. The method of applying fusible glazes and other ceramic coatings on material of varying absorbency including ceramic ware and non-absorbent and relatively non-absorbent material including metal which comprises the steps of subjecting to pressure a mixture of an aqueous liquid carrier and fusible ceramic solids suspended therein, directing said mixture in a cyclic path within a nozzle structure, said cyclic path having a vortex, discharging said mixture through an orifice at the center of the vortex of said cyclic path and toward the surface of the object to be coated, maintaining said nozzle within range of said object but at a distance from said object sufficient to allow atomization and dispersion of said mixture before contact with said object, impinging overspray on solid surface means provided in the path of the overspray, and collecting overspray run-off from said surface means.

References Cited in the file of this patent

UNITED STATES PATENTS

| | | |
|---|---|---|
| 2,435,931 | Schweitzer | Feb. 10, 1948 |
| 2,527,093 | Du Fay | Oct. 24, 1950 |